Dec. 1, 1942.  W. J. MILLER  2,303,888
CUTTING OFF PLASTIC CERAMIC BODIES FROM PARENT MASSES
Filed May 8, 1940  2 Sheets-Sheet 1
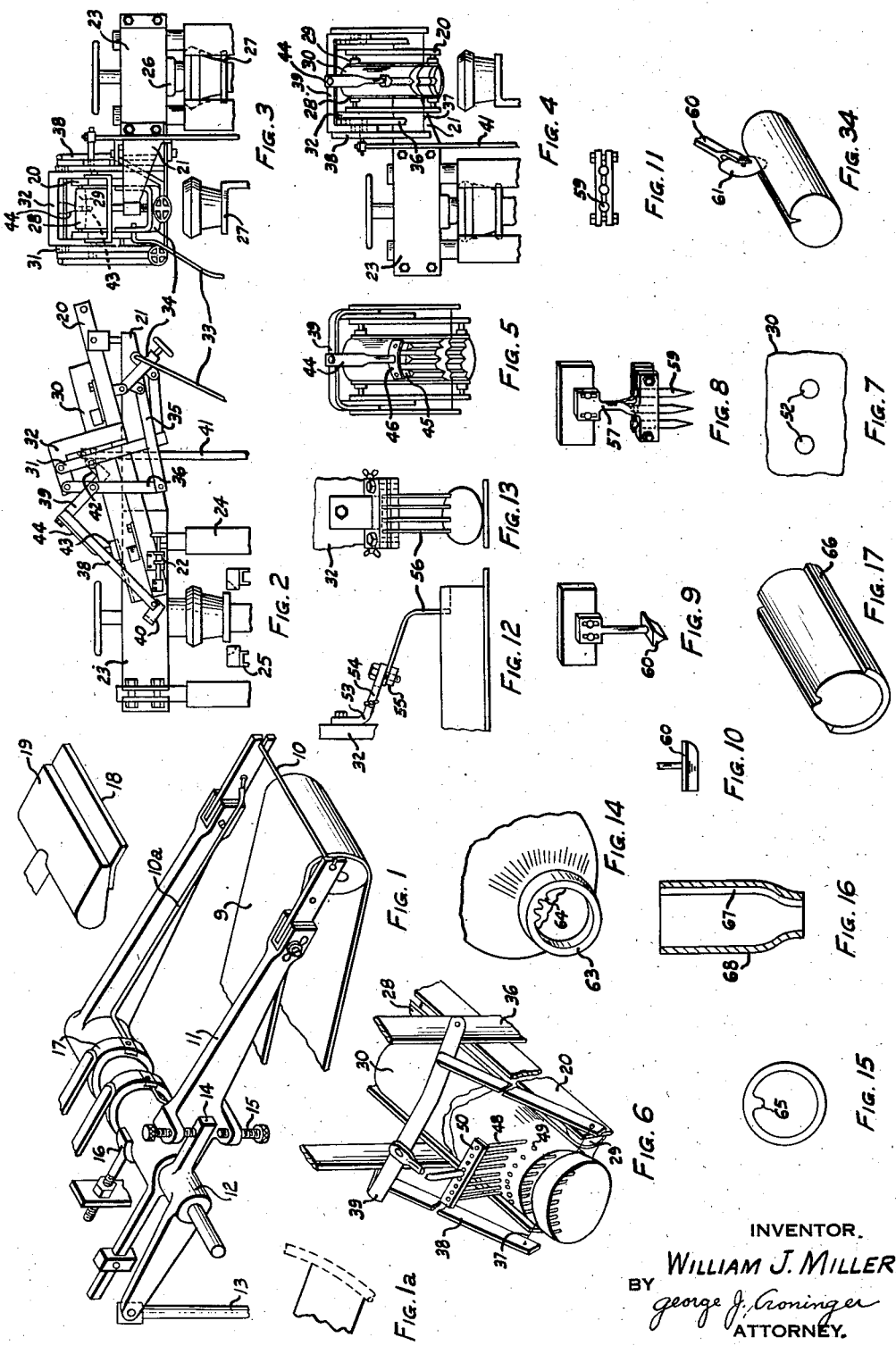
INVENTOR.
WILLIAM J. MILLER.
BY george J. Groninger
ATTORNEY.

Dec. 1, 1942.  W. J. MILLER  2,303,888
CUTTING OFF PLASTIC CERAMIC BODIES FROM PARENT MASSES
Filed May 8, 1940  2 Sheets-Sheet 2
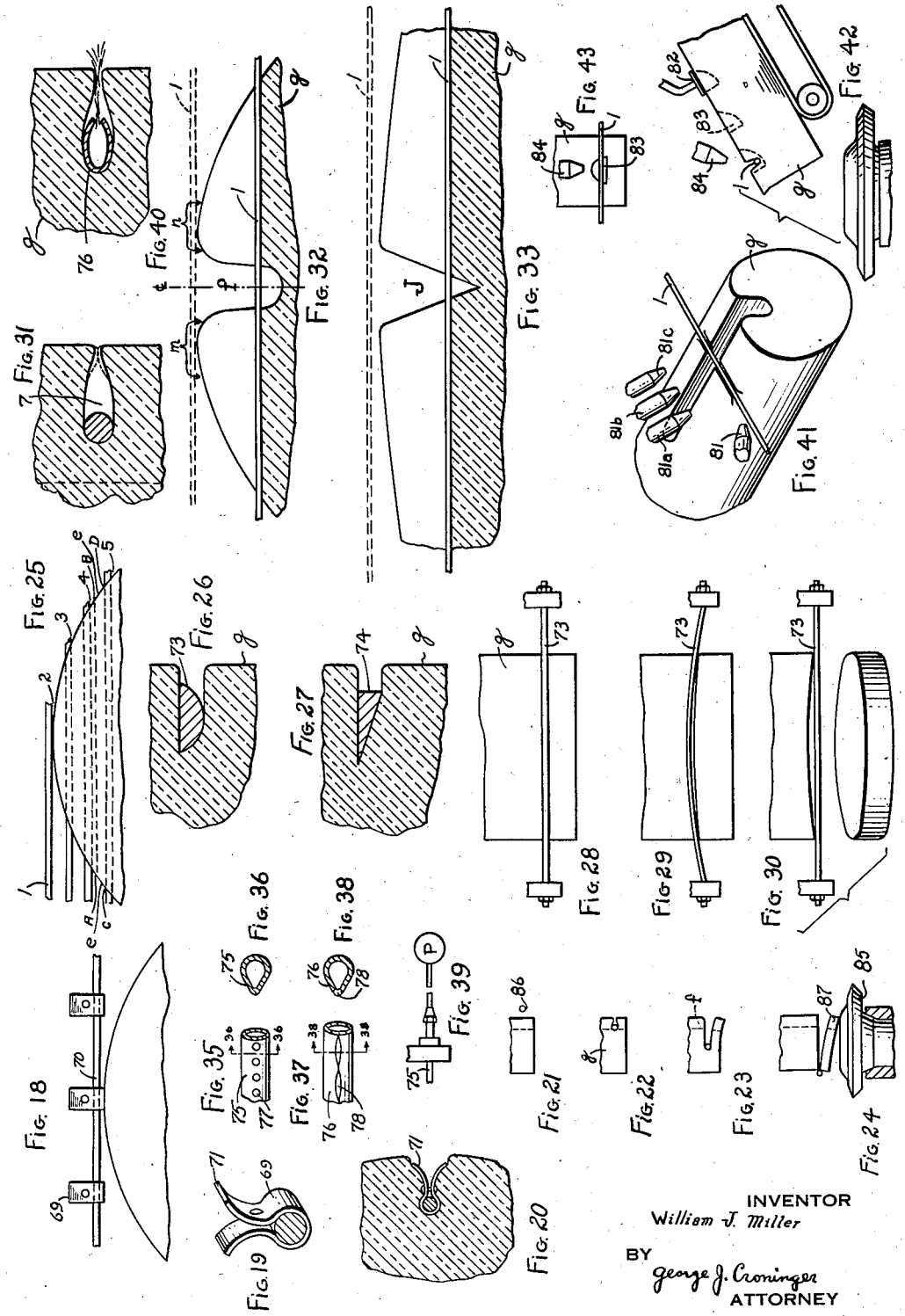
INVENTOR
William J. Miller
BY George J. Croninger
ATTORNEY Patented Dec. 1, 1942

2,303,888

UNITED STATES PATENT OFFICE 2,303,888

CUTTING OFF PLASTIC CERAMIC BODIES FROM PARENT MASSES

William J. Miller, Swissvale, Pa.

Application May 8, 1940, Serial No. 334,050

20 Claims. (Cl. 25—22)

This invention relates to cutting off plastic ceramic bodies from parent masses. It has to do with the making of mold charges from plastic ceramic material in the manufacture of pottery ware, particularly the forming of charges of clay for feeding to jiggering molds in the manufacture of semi-vitreous, vitreous and earthenware products such as plates, cups and saucers and the like.

The present invention is adapted but not limited to use in connection with mass producing processes and apparatus for the manufacture of ware of the class described, particularly automatic processes and apparatus wherein the feeding of the clay to the molds is accomplished mechanically and in timed relation with the performance of other operations also automatically performed such as preforming, jiggering and mold transportation and manipulation.

This application shows and describes subject matter appearing in my co-pending applications for United States Letters Patent, Serial Nos. 32,391 and 219,385.

Charges of clay may be formed by slicing off individual bodies from a parent mass. Where this is done in suspension, gravity influences the separation of the charge of material and said charge may be deposited in predetermined position on the molding surface of a mold by properly locating and positioning said mold at the feeding position either manually or automatically. Subsequent to segregation, the charge of clay may be performed in any desired fashion, for instance, by pressing with a contoured die or spun with a rotating spreader and thereafter jiggered either automatically or by hand. My British Patent #471,589 shows how certain of these operations may be performed automatically and in timed sequence.

As explained in my co-pending application #32,391, the charge of clay may utterly fail to release from the parent mass during the cut or after it has been made, or it may become partly separated without becoming completely detached, or it may separate but tardily. Where the charge is being fed directly to a mold in an automatic system of ware fabrication where the position of the charge on the mold has an important bearing on the proper performance of subsequent fabricating operations, the aforesaid undesirable conditions may cause the following results, either the charge may miss the mold entirely or it may not be disposed in appropriate position thereon. In a production system of this character, such unreliability in the feeding of the plastic material to the molds can produce production handicaps both in respect of quantity and quality and generally there may be serious interference with the systematic manufacture of good ware.

I have found that in slicing bodies of clay from a parent mass with an instrumentality such as a tensioned wire, there is a tendency induced by natural and mechanical causes for the walls of the initial indentation or incision to come together and form a seal behind the cutting wire. This is due to the surface tension of the clay being strong enough to pull the opposing surfaces into contact under the force applied by the wire. Plastic jiggering clay is highly adhesive and the severed portions will stick tightly if they come together. If this happens upon the making of the initial indentation or cut, a chamber substantially closed to atmosphere is produced in which exists a vacuum or partial vacuum. During forward progress of the wire, the trailing vacuum collapses the walls of the cut in rear of the wire, thereby welding or tending to weld the slice to the parent mass and making it difficult if not impossible for a separating force, such as for instance, gravity, to function in the release thereof.

One object of the present invention is to provide a method and apparatus for segregating and reliably detaching charges of plastic clay from a parent mass in uninterrupted succession.

Another object is to provide method and apparatus capable of producing and reliably feeding charges of clay to molds adapted for use in connection with periodically operating automatic ware fabricating machinery.

Another object is to provide method and means capable of preventing serious interference, by any or all of the undesirable reactions associated with cutting, with the influence of a separating force, for instance, gravity, to reliably secure the detachment of the charge from the parent mass concurrently with the passage of the cutting instrumentality through the material.

In the drawings,

Fig. 1 is a perspective view of a segregating device embodying means for heating, wiping and drying segregating wire.

Fig. 1a is a motion diagram showing the path of travel of the segregating wire of Fig. 1.

Fig. 2 is a side elevation of a feeder similar to that of Fig. 1 embodying means for grooving or scoring surface of the parent body of clay from which charges are segregated.

Fig. 3 is a rear elevation of the apparatus shown in Fig. 2.

Fig. 4 is a front elevation of the apparatus shown in Fig. 2.

Fig. 5 is a front elevation of the feeder shown in Fig. 4 with a plural scoring tool.

Fig. 6 is a perspective view of the segregating end of the feeder shown in Fig. 4 equipped with means to perforate the clay in the direction of the cutting plane.

Fig. 7 illustrates how the perforation may be staggered as respects the line of cut.

Fig. 8 is a perspective view of a stationary grooving or scoring device embodying a multiple of pointed scoring tools.

Fig. 9 is a perspective view of a stationary scoring tool of wedge shape.

Fig. 10 is a side elevation of the tool of Fig. 9.

Fig. 11 is a plan view of the tool holder of Fig. 8.

Fig. 12 is a side elevation of a stationary tool holder embodying plural grooving or scoring means in the form of wires or the like.

Fig. 13 is a front elevation of the apparatus of Fig. 12.

Fig. 14 is a detail of an extrusion nozzle showing how the die may be formed to produce indentations in the clay extruded therethrough.

Fig. 15 is a detail of another form of extrusion die.

Fig. 16 is a sectional elevation through the barrel and nose of an extrusion cylinder showing how it may be internally ribbed to produce longitudinally indented clay bodies.

Fig. 17 is a perspective view of a detached body of clay produced with the die of Fig. 15 and the extrusion machine of Fig. 14 together with rigid means for transporting the same to a feeding position.

Fig. 18 is a detail of a cutting wire and slug of clay showing a wire clip for mechanically opening up the gap.

Fig. 19 is an enlarged perspective view of one of the aforesaid wire clips.

Fig. 20 is a detail in sectional elevation showing the wire clip of Fig. 19 in action.

Figs. 21 to 24 inclusive are a series of four views detailing the action in the course of segregating the slice of clay and depositing the same on a mold.

Fig. 25 is a cutting diagram illustrating the rapid increase in the width of cut at the beginning of the incision.

Fig. 26 is an enlarged detail in sectional elevation showing a cutting wire of segmental section.

Fig. 27 is a view similar to Fig. 26 showing a wedge section cutting wire.

Figs. 28, 29 and 30 are three views in top plan showing the action of the segregating wires of Figs. 26 and 27 during the progress of the cut.

Fig. 31 is an enlarged detail in sectional elevation showing a circular wire making an incision in a grooved slug.

Fig. 32 is an elevation partly in section illustrating a cutting wire incising a grooved slug of clay.

Fig. 33 is a view similar to that in Fig. 32 illustrating a cutting wire incising a slug of clay having a V shaped surface cut.

Fig. 34 is a perspective view illustrating one method of producing a groove similar to that of Fig. 33.

Fig. 35 is a perspective view of a hollow cutting wire by means of which a gaseous discharge capable of preventing readhesion of segregated clay may be applied.

Fig. 36 is a vertical section through the wire of Fig. 35.

Fig. 37 is a perspective view of another form of segregating wire of the class illustrated in Fig. 35.

Fig. 38 is a vertical section of the wire of Fig. 37.

Fig. 39 is a detail showing how the segregating wires of Figs. 35 and 37 may be connected to a source of pressure.

Fig. 40 is an enlarged detail of a hollow cutting wire with a continuous discharge opening of the class of those shown in Figs. 35 and 37 in action.

Fig. 41 is a perspective view illustrating how gravity may be assisted in separating charges of clay being wire segregated by the external application of fluid under pressure.

Fig. 42 is a side elevation showing another method of how this may be done.

Fig. 43 is a plan view of the forward end of the slug shown in Fig. 42.

In order to prevent the normal reaction between the cutting wire and the clay from producing conditions detrimental to the reliable detachment of the charge of clay from the parent mass, the opposing surfaces of the initial indentation or gap produced by advancement of the segregating wire into the parent body must be prevented from sealing or coming together adhesively at least until such time as the influence of a separating force can become such a definite factor in the separation that adhesion is of no consequence. Moreover, if the surfaces should contact during the early stages of the cut, then the zone of adhesion should be minimized and not permitted to spread and should be held to such proportions that it will not interfere with the ability, say for instance of gravity, to produce separation.

Resealing is particularly apt to occur in connection with cutting off charges of clay with a wire from a cylindrical column of ceramic material by passing the wire therethrough in a direction perpendicular to the longitudinal axis of the column. Apparatus for cutting off charges of clay mechanically in this fashion is illustrated in my co-pending applications mentioned hereinbefore and the present improvements are illustrated and described herein, by way of example, as they would be applied to charge making by methods and apparatus of this description.

The cutting wire is presented tangentially to the surface of the cylindrical column of clay, see Fig. 6, and is passed therethrough crosswise of the long axis thereof. The wire therefore first engages the clay at a point on the circumference of the column and as it advances inwardly therefrom, the surface is indented but not incised necessarily due to the surface tension of the clay. The wire may deeply indent the clay before an actual incision is made and the surface clay behind the wire tends to be pulled into the indentation, bulging as it enters and coming together a short distance behind the wire, thus forming a chamber or cavity trailing the wire. This primary reaction produces a short edge seal between the opposing surfaces which is of enough length or value to suspend the adjacent severed charge portion against gravitational pull, the charge having little weight at this stage of the process.

The time required to automatically pass a cutting wire through a column of jiggering clay of average diameter, say 2 to 5 inches, is normally less than a second. Since the wire travels rapidly, the walls of the indentation or incision do not unite immediately behind the wire and therefore the cavity or chamber formed is of wedge-like proportions in cross section somewhat as shown at 7 in Fig. 31. Due to the tangential relation of the wire to the cylindrical column, a small degree of inward advance on the part of the cutting wire produces a rapid increase in the length of the vacuum chamber as may be noted by a comparison of the amount of cutting wire 1 immersed in the column at depths 2, 3, 4 and 5 in Fig. 25, the depth 5 indicating roughly about one-sixth the total diameter of the column. The vacuum chamber at depth 5, Fig. 25, may be considered as being bounded by lines A—B and C—D, the flexible cut edges of the segregated and unsegregated portions of the material having progressively sealed up to this depth leaving only minute openings or vents e through which air may be admitted to the chamber 7. These openings are insufficient to enable air in the quantity required to preclude the formation of the vacuum to enter the chamber and they do not increase in size or area, although the capacity of the chamber rapidly increases from depth 2 to depth 5. The vacuum therefore obviously becomes more efficient as penetration increases up to at least the first one-sixth of the total distance travelled and the vacuum therefore pulls the thin cut edges inward, tending to further restrict the size of the openings and reduce the possibility of venting the chamber. The trailing vacuum chamber 7 progressively collapses the surfaces freshly segregated almost with the speed and force of impact.

As the wire advances deeper into the material, air at atmospheric pressure may leak into the chamber through the openings at e and eventually reduce or dissipate the vacuum, but it is highly improbable that this would occur before detrimental adhesion had taken place in the vital zone, for instance, between depths 2 and 5, Figure 25. Therefore, at the end of the stroke, the slice is welded fast to the parent body in whole or in part and it should be quite obvious that any "sticking up" of the charge after the segregating wire has passed entirely through the material will produce a delay in the release thereof from the time normally to be expected. It can readily be seen that if a mold is being automatically presented at the charging position at a predetermined time and remains there for a predetermined interval in a predetermined position and the slice fails to release on schedule, it is highly improbable that the slice will strike the mold properly if it becomes detached at all after the mold has started to be withdrawn from the charging position.

I have discovered that resealing can be avoided or minimized to such degree that there will be no detrimental effect on reliable separation of the charge, by producing in the body of the parent mass one or more sunken spaces extending below the general level of the surface of the mass and across the bisecting line determined upon, said sunken space or spaces being disposed preferably in the zone of initial indentation or incision of the parent mass of clay by the cutting wire or instrumentality. Such sunken spaces may range from a deep indentation, preferably without the removal of material of the parent mass in order not to deplete the volume of material contained in the charge, to holes punched in the surface or surface scores, grooves or scratches of no appreciable depth. Moreover, said sunken spaces may cross the line of bisection at right angles thereto as in the case of an indentation or score extending lengthwise of the column or in the case of holes punched in the material they may extend in a circumferential line for at least a portion of the distance around the column on the line of bisection determined upon, and they may be staggered with relation thereto or located on a common center line.

By the provision of a sunken space or spaces of the character herein described in the column of clay certain results appear to be obtained in eliminating the undesirable reactions which normally occur incident to severing charges with a wire or like instrumentality. With reference to the illustration of Figure 32, wherein an indentation f is shown as extending longitudinally of the column of clay g in the zone on the circumference of the column which would normally be first contacted by the cutting wire 1, at least one result is to reduce the amount of material with which the cutting wire contacts at the time of making initial indentation or incision in the column of clay. A reduction in the amount of material in this zone effects a reduction in the surface available to transmit a pulling effort on the lips of the portion initially indented or incised such as would tend to pull them together. Furthermore the area of this portion initially incised or indented is reduced and divided. The tendency is for the opposing walls of the initial indentation or incision not to come completely together (full lines in Figure 31), thus avoiding a preliminary seal or the creation of an adhering relationship between the opposing walls such as would be responsible for the production of a vacuum chamber upon further inward progress of the wire.

Where there is no actual adhesive contact between the opposing walls of the cut then the pull of gravity is fully effective from the very first instant of indentation or incision to separate the slice from the parent body and as the incision progresses, the slice separates cleanly and reliably. By the time the wire has penetrated to the depth of the indentation f, the segregated portion will have gained sufficient weight and will have sagged down sufficiently to prevent any possibility of the walls of the gap being pulled together as the cut becomes diametrically continuous.

However, should the marginal edges of the opposing walls of the initial indentation or incision come together, (Figure 32 and dotted lines Figure 31), in the zones subtended by arcs m and n, breasting the cutting wire where it would be most likely to occur, and thereby form a chamber or the beginnings of one on each side of the center line, Figure 32, extending inwardly from this zone of the periphery of the column to the cutting wire 1, the actual area of adhesive contact is not only less circumferentially due to the indentation f but is limited to the marginal edges of the contacting lips and does not spread as the wire advances deeper into the material.

The reason for this appears to be that the smaller capacity of the chambers, in comparison with that of the single long continuous chamber heretofore produced, is more in proportion to the size and ability of the intakes e to admit air thereto in sufficient quantity to equalize the pressure inside and out and prevent vacuumization. Due to the elimination of material at f, the growth of the chambers in area is not so rapid, (even though the cutting wire travels at the normal speed) as to exceed the capacity of the intakes.

There is no high speed intake of air such as would suck in the thin cut edges and reduce the size of the intakes. In fact, since a vacuumized condition is not created with the closing of the marginal lips in the zones $m$ and $n$, the intakes become elongated and increase in intake capacity as the wire progresses into the material until such time, of course, as the influence of gravity breaks the edge seal and frees the severed portion. Obviously the number of separate chambers into which, what would normally be one continuous chamber, may be divided is not limited to two. The greater the number of chambers, the smaller the capacity of each in relation to the size of intakes and the greater the ability to equalize the pressure inside and out. Not being drawn against the parent body by a vacuum, the slice gathers weight and gravity breaks the marginal seal before any delay such as would interfere with the timing and proper deposit of the charge on the mold occurs.

The sunken space need only penetrate the surface. $j$, Figure 33, is representative of one or more grooves lengthwise of the column and in close adjacency in practice and in close adjacency to the point of initial contact of the wire with the circumference of the column. These grooves or scores bring about a reduction in the amount of material engaged by the cutting wire as it initially penetrates the surface of the slug, thereby eliminating this amount of material from making adhesive contact or pulling other areas into contact under the force exerted by the cutting wire. Moreover, said grooves or scores provide a means of admitting air to the zone of the incision immediately behind the cutting wire and prevent the establishment or the maintenance of a vacuum chamber so efficient that the pull of gravity may be overcome and the surfaces rewelded.

By counteracting or destroying the effectiveness of the cutting wire to draw the opposing surfaces of the indentation or incision into contact at the very start, the opportunity for a vacuum chamber to form is considerably minimized and by establishing a means of appropriately venting the vacuum chamber (should one be formed), there is little possibility of gravity not being able to effect a reliable separation of the charge concurrently with the passage of the cutting wire through the material. Other methods of preventing the opposing surfaces of the original indentation or incision are also disclosed herein, said methods fundamentally operating according to principles in common with those hereinbefore specified.

I propose to prevent resealing by removing after each and every cut from the segregating wire such clay residue as may have accumulated thereon during the stroke. By doing this, such residue will be prevented from wiping between the lips of the initial indentation or incision which otherwise would effectively plug or seal the gap and immediately produce a vacuum chamber without benefit of the lips actually coming into contact. Furthermore, the wire is preferably dried subsequent to each cutting stroke and operated at a temperature capable of vaporizing liquid constituents of the material. This hardens the opposing surfaces of the incision rendering them less adhesive should they come in contact and easier to separate. Moreover, the presence of an expanding fluid or gas in the incision tends to maintain the segregated surfaces in spaced apart relation. In other words, steam is generated in the gap and this exhausts rearwardly in the direction reverse to that being travelled by the wire thereby maintaining the cut open.

Another method somewhat similar thereto is to provide for the introduction of a blast of air under pressure between the incised surfaces, particularly during the initial stages of progress of the segregating means into the material.

Another method is to provide mechanical means capable of forcing the bisected portions apart.

With reference to the apparatus shown herein, Fig. 1 discloses means for heating, drying and wiping a segregating wire. 9 is an inclined conveyor belt on which cylindrical slugs of clay are disposed, the belt being periodically advanced to the right in order to bring the lead end of the cylindrical body into the range of operation of the cutting wire 10. 11 is a cutter frame pivoted on an eccentric sleeve 12 oscillated by rod 13 to alternately move abutment 14 into frame elevating or lowering engagement with adjustable screws 15. This causes the cutting wire 10 to traverse the arcuate path shown in Fig. 1a. At the termination of the downward stroke as well as the upward stroke, the frame 11 is held against rotation by friction drag 16 whilst the abutment 14 travels between screws 15 and the frame is moved to shift the cutting wire through the path of travel illustrated. Screws 15 permit variation in the travel of the wire vertically with respect to the column of clay and longitudinally thereof.

The segregating wire 10 is electrically heated and connected in an electrical circuit by wires 10a. It may be continuously or intermittently energized according to the type of ring contact 17 used. Heating the wire helps dry it after adhering clay is removed by a stationary canvas wiper 18 positioned above the column of clay and in position to engage the segregating wire and clean it before said wire commences upon the cutting stroke. Hot air may also be directed against the wire by nozzle 19 to further assist in drying it.

If desired, the cutting wire may be operated at a temperature sufficient to vaporize liquid constituents of the plastic clay. This induces hardening of the walls of the incision and reduces the adhesive factor. It also produces a vapor or gaseous medium at or above atmospheric pressure capable of maintaining the segregated material in spaced apart relation.

In Figs. 2, 3 and 4, there is disclosed a feeder similar in many respects to that shown in Fig. 1, said feeder being substantially as shown in my co-pending application, Serial No. 219,385.

20 designates the feeder frame which is supported by an arm 21 and a bracket 22 from the lintel 23 of an automatic jiggering machine 24. This machine is shown and described in my co-pending application, Serial No. 219,385, and includes a reciprocating mold transfer 25 for transporting molds from the feeding position to the press and jigger positions, the press position being illustrated herein by the die 26, Fig. 3. Mold chucks 27 located at the feed and press position respectively manipulate and position the mold thereat.

Mounted on the frame 20 is a belt 28 suspended between rollers 29, said belt supporting the column of clay 30. The belt is intermittently advanced toward the mold, Fig. 2, by means of a clutch, not shown, associated with swinging levers 31 that is pivotally secured to a bracket 32.

When the rod 33, which is connected to an operating part of the machine, is pulled down, the pivoted U shaped lever 34 is moved to the left thereby swinging the lever 31 forwardly, the clutch being open and not in driving engagement with a belt during this motion. Concurrently with shifting lever 31 to the left, lever 35 also connected to the U shaped lever 34 is shifted to the left, thus rotating a pair of levers 36 pivotally suspended from bracket 32 to the left and projecting the cutting wire 37 to the left and in the direction of travel of the column of clay. The cutting wire is suspended between rods 38 welded to a bracket 39 pivotally mounted on lever 36. After the charge of clay 40 has been cut, the wire is shifted to the left so as to clear the lead end of the slug and is then elevated by rod 41 which pulls down on an extension 42 of bracket 39. When the cutting wire 37 is in elevated position, the rod 33 retracts the lever 34 thereby moving lever 31 to the right and advancing the belt 28 to shift the column of clay into the range of operation of the cutting wire. Rod 41 is then elevated which causes the wire 37 to be passed through the column of clay. As the cutting wire descends, a tool 43 capable of producing a sunken space, in this case a groove, in the top surface of the column of clay is moved into indenting engagement therewith. The tool 43 is mounted on a holder 44 bolted to the center of the bracket 39. Obviously, different sizes, forms and shapes of tools may be provided, for instance, the multiple tool arrangement of Fig. 5 wherein the holder 46 is adapted to accommodate a plurality of tools 45 arranged on a radius preferably corresponding to the radius of curvature of the column of clay. If it is desired to produce apertures such as those shown at 49, Fig. 6, a device comprising a holder 50 with a plurality of rod shaped punches 48 may be provided. The punches may be arranged in alignment transversely of the tool or they may be staggered so as to produce staggered openings as shown at 52 in Fig. 7.

Sunken spaces such as continuous grooves, indentations and the like may be produced by stationary tools, for instance, as illustrated in Figures 12 and 13. This tool-holder comprises a stationary member 53 bolted to a stationary part of the feeder, viz., the bracket 32, and a hinged tool holder 54 having a clamp 55 between which are gripped one or more grooving or indenting means such as the stiff rods 56 which are bent downwardly at the clay engaging ends. Any desired depth of penetration may be obtained by loosening the hinge and repositioning the holder 54.

Figures 8 and 11 illustrate another form comprising a vertically adjustable support 57 having a clamping holder for one or more pointed tools 59, said holder being adaptable for mounting on a stationary (32) or movable (39) machine part.

Figure 9 discloses a vertically adjustable scoring tool 60 wedge shaped in cross section and having a streamline nose, Figure 10, said tool being adapted for stationary mounting.

Figure 34 shows how a groove may be produced by a cutter in the form of a disc 61, pivoted in a bifurcated holder 60.

Figure 14 shows how clay may be forced through a die 63, provided with ribs 64 or a single rib 65, Figure 15 on the inner circumference to produce a continuous groove or grooves. If the clay is forced out in a long column, the groove or grooves and the shape of the column may be preserved by extruding the material directly into a rigid transportable holder 66, Figure 17. The clay column may be placed directly on the belt 25 and, the groove or indentation being already performed incident to extrusion, makes unnecessary the need for grooving tools on the feeder.

Figure 16 illustrates a continuous rib 67 that projects upwardly into the container 68 and is capable of producing a continuous groove or indentation in a column of clay. The clay may be sliced off periodically as it emerges from the restricted outlet.

In Figures 18, 19 and 20, I have shown how to mechanically separate the edges of the cut. 69 are spreading devices one or more of which are clamped on the cutting wire 70. The outwardly curved terminals 71 of these devices are capable of forcing the edges of the cut apart as shown in Figure 20, thereby reducing the actual area of contact between the lips of the incision if not preventing contact altogether in other zones. By holding the incision open at least in the zone of the spreaders air may easily be admitted to the zone immediately behind the cutting wire thereby avoiding a vacuum. Moreover, the spreaders actually force the segregated portions apart due to the clay following the curved surfaces.

In Figure 26, the cutting wire 73 is segmental in cross section. In Figure 27 wire 74 is wedge shaped and the wires arch, Figures 28 and 29, as they cut particularly when the stroke is rapid but straighten out, Figure 30, when the cut is completed. Arching opens up a wide gap and insures ample admission of air to break up any vacuum and the cross section of either wire is such that, as compared with a perfectly round wire, the flow stream of clay part the wire in along diverging rather than converging lines in rear of the wire. This aids in preventing the lips of the incision coming together.

In Figures 35 to 39, inclusive, I have shown hollow cutting instruments, 75 and 76, perforated as at 77 and 78 respectively. These instruments are adapted to be connected with a source of air under pressure, viz., the pump or compressor P, by means of which compressed air may be exhausted intermittently or continuously through the perforations to blow the opposing walls of the incision apart, see Figure 40.

In Figure 41, I have shown how air may be applied from one or more points located external to the body of clay to induce separation of the slices. Several nozzles located at various positions have been shown and one or more thereof may be used depending upon the requirement. For instance, the nozzle 81 is located above and on line with the segregating instrument and is adapted to raise and lower with the cutting wire. The stream of air may be directed along the wire through the incision from one side to the other to thereby either blow the opposed surfaces apart or dispel a vacuum behind the cutting wire by means of a forced draught. Other of the nozzles such as those shown at 81a, 81b, and 81c are directed lengthwise of the column, the nozzles 81 being directed into the central groove or indentation in the column. Obviously the air jets may be positioned at any point where it is desired to induce separation of the slices.

With reference to Figures 42 and 43, an indenting tool 82 preferably mounted on a swinging bracket, such as that shown at 39, intermittently produces spaced pockets 83 in the column. Compressed air is directed forcefully against the forward wall of the pocket by nozzle 84 as the cutting wire slices therethrough to thereby induce separation of the slice.

Figures 21 to 24 inclusive illustrate the sequence of operations in cutting off a mold charge from a cylindrical column of clay wherein the column is disposed in vertical position so as to obtain maximum influence of gravity in the separation of the foresaid slice or mold charge.

Flatware mold 85 is first positioned below the lowermost end of the column preferably in the axial alignment therewith. If the mold is positioned mechanically, presentation at the charging position will be in timed relation with the movement of the cutting wire 86, the mold being preferably at rest during the segregating operation. In order to minimize stretching or distortion of the slice, the mold may closely approach the end of the column so that the slice 87 may sag down and contact the molding surface before severance is completed.

The column of clay has been previously indented, there being a longitudinal groove in the external surface thereof as illustrated at *f* on the side first contacted by the cutting wire. As the cutting wire enters the material, the slice is cleanly severed and gravity compels the segregated material to separate from the parent mass without interference from forces of adhesion.

While I have detailed certain primary reactions as I have observed them, resulting from providing a sunken space in the parent mass of clay, and then cutting through the walls of the sunken space, in overcoming the drawbacks heretofore experienced, there may be other reactions responsible for the beneficial results achieved of which I am not aware which nevertheless are, and are to be considered as, inherent herein.

Having thus described my invention, what I claim is:

1. A method of preventing the rebonding of a charge of clay of the consistency of jiggering clay to a parent mass as the material is bisected which comprises, producing in the body of the parent mass one or more sunken spaces extending across the bisecting line determined upon, then passing the bisector through the material forming the walls of the sunken space or spaces and progressively drawing the charge away from the parent mass as the bisector passes through the material.

2. A method of preventing the rebonding of a charge of clay of the consistency of jiggering clay to a parent mass as the material is bisected which comprises, producing in the parent mass across the bisecting line determined upon one or more sunken spaces extending inwardly from the surface of the mass to thereby reduce the area of contact between the bisector and the material at least during the stage of initial progress of the bisector into said material, passing the bisector through the material and drawing the charge of clay away from the parent mass as the bisector passes through the material.

3. A method of preventing the rebonding of a charge of clay of the consistency of jiggering clay to a parent mass as the material is bisected which comprises, producing in the body of the parent mass one or more sunken spaces extending across the bisecting line determined upon without depleting the volume of material contained in the mass to any appreciable degree, then passing the bisector through the material forming the walls of the sunken space or spaces, while at the same time drawing the charge of clay away from the parent mass.

4. A method of preventing the rebonding of a charge of clay of the consistency of jiggering clay to a parent mass as the material is bisected which comprises, reducing the extent of contact between the bisector and parent mass at least in the zone of initial indentation and incision by producing spaces sunken in the mass, then incising the material by cutting through the material forming the walls of the sunken space or spaces while at the same time drawing the charge of clay away from the parent mass.

5. A method of preventing the rebonding of a charge of clay of the consistency of jiggering clay to a parent mass as the charge is severed which comprises, producing in the body of the mass an indentation extending longitudinally thereof, cutting through the walls of the indentation in the direction at right angles to the length thereof, while at the same time pulling the charge of clay away from the parent mass.

6. A method of feeding charges to molds in the manufacture of pottery ware which comprises, producing a body containing material for a multiple of mold charges, presenting molds at a segregating position in timed relation with the cutting off of slices of clay from the aforesaid parent mass and depositing of said slices of clay on said molds and preventing the rebonding thereof to the aforesaid parent mass as the slice is severed by producing in the parent mass a sunken space across the line of severance determined upon, and then cutting through the walls of the sunken space, while at the same time drawing the slice away from the parent mass.

7. The method of feeding charges to molds in the manufacture of jiggered pottery ware which comprises, forming a body of clay containing a multiple of mold charges, said body being of substantially cylindrical proportions and then cutting through the body in a direction crosswise of the long axis thereof to produce a slice of clay adapted to be deposited on a mold and preventing the rebonding of the charge of clay to the parent body as the charge is severed by previously producing in the body one or more sunken spaces extending across the bisecting line through which the cut is made and pulling the slice away from the parent mass in progressive fashion as the cut is made.

8. A method of preventing the rebonding of a charge of clay of the consistency of jiggering clay to a parent mass as the material is bisected which comprises, producing in the body of the parent mass a sunken space and forcing air under pressure through the bisector and in a direction opposite that being taken by the bisector in order to maintain the bisected surfaces in spaced apart relation.

9. A method of preventing the rebonding of a charge of clay of the consistency of jiggering clay to a parent mass as the charge is severed which comprises, passing a cutting instrument through the material along the bisecting line determined upon and maintaining the bisected surface in spaced apart relation by impinging a current of fluid upon the portion being segregated.

10. A method of feeding a charge to jiggering molds in the manufacture of jiggered pottery ware which comprises, forming a body of clay containing a multiple of mold charges and then slicing the body to produce individual mold charges adapted to be gravitated onto the forming surface of the molds and preventing the rebonding of the charge of clay to the parent mass as it is segregated by previously forming indentations in the surface of the mass across the bisecting line determined upon.

11. In apparatus of the class described, in combination, a mold, means for supporting a parent mass of plastic ceramic material containing material sufficient for a multiple of charges thereabove, means for segregating bodies of plastic ceramic material from said parent mass, means for producing a sunken space or spaces in the aforesaid mass across the line of bisection determined upon to thereby prevent rebonding of the charge of material to the parent mass as the segregating means is passed therethrough, the charge of material thus produced being deposited by gravity on the surface of the mold.

12. In apparatus of the class described, in combination, a jiggering mold, means for supporting a parent mass of plastic material superimposed relative thereto, means for segregating a charge of material therefrom adapted to be deposited on said mold, means for producing a sunken space or spaces in the body of the mass across the line of bisection determined upon to thereby prevent rebonding of the charge of material to the parent mass as the segregating means is passed therethrough, and means for relatively moving said mass and said means for producing a sunken space or spaces in the body of the mass.

13. In apparatus of the class described, in combination, a mold, means for supporting a parent mass of clay superimposed relative thereto from which mold charges are segregated, means for segregating mold charges therefrom, means for producing a sunken space in said mass across the bisecting line determined upon to thereby prevent rebonding of the charges of clay to the parent mass as the material is bisected comprising a rigid instrumentality located so as to penetrate the mass in the desired region and means for relatively moving the mass and the rigid instrumentality to produce a sunken space across successive bisecting lines determined upon.

14. In apparatus of the class described, a mold, means for supporting a mass of plastic ceramic material superimposed relative thereto, means for producing a sunken space in said mass across the bisecting line determined upon, one or more jets for impinging fluid against or between the walls of the severed and unsevered portions to thereby maintain the walls in spaced apart relation and prevent rebonding of the portion being segregated to the parent mass.

15. In apparatus of the class described, the combination which comprises, a support for a mass of clay containing a multiple of mold charges, a severing means for segregating charges of clay therefrom and molds on which charges of clay are deposited together with means for hardening the lips of the incision made by the severing means concurrently with the passage of the cutting means therethrough to preclude rebonding of the charge to the parent mass.

16. In the manufacture of pottery mold charges the method which consists in advancing a body of clay containing a multiple of mold charges in endwise fashion toward a charge segregating and mold charging position, intermittently passing a segregating instrument through the body of clay to separate charges of clay therefrom, gravitating the slice of clay onto the forming surface of the mold and preventing the rebonding of the charge of clay to the parent mass as the instrument passes therethrough by producing a sunken space in the surface of the mass and passing the instrument through the walls of the sunken space.

17. The method of charging pottery ware molds with clay which comprises forming a billet of clay containing a multiple of mold charges, advancing the billet in endwise fashion and in a downwardly course toward the molding surface of the mold, passing a cutting wire through the billet in a direction crosswise of the long axis of the billet and preventing rebonding of the charge of clay to the billet in order that the charge may be reliably deposited on the mold by previously producing one or more sunken spaces in the surface of the billet first contacted by the segregating wire and whilst drawing the segregating wire through the sunken space or spaces pulling the charge of material away from the billet.

18. In the making of individual bodies of clay wherein the bodies are cut off a parent mass containing material for several bodies, the method of preventing the rebonding of individual bodies of clay to the parent mass as they are cut off which comprises producing in the body of the parent mass one or more indentations and cutting through the indentation or indentations whilst drawing the body away from the parent mass by the force of gravity.

19. In the charging of jiggering molds with plastic clay wherein slices of clay are cut off from a parent body and deposited on said molds, the method of preventing the rebonding of a slice of clay to the parent mass as it is cut off which comprises scoring the surface of the parent mass and at the commencement of the cut, cutting through the scored portion whilst pulling the sliced material away from the parent mass.

20. In apparatus for feeding clay to pottery molds, the combination which comprises, means for supporting a mass of plastic ceramic material, a segregating means, means for indenting the mass of material, means for relatively moving said segregating means, said mass of clay and said indenting means whereby an indentation is produced in the mass of material across the bisecting line before the cut is made to prevent rebonding of the charge to the parent mass, the charge being pulled away from the parent mass as the cut is made, a mold support and mold removably disposed thereon in position to receive the charge.

WILLIAM J. MILLER.